UNITED STATES PATENT OFFICE.

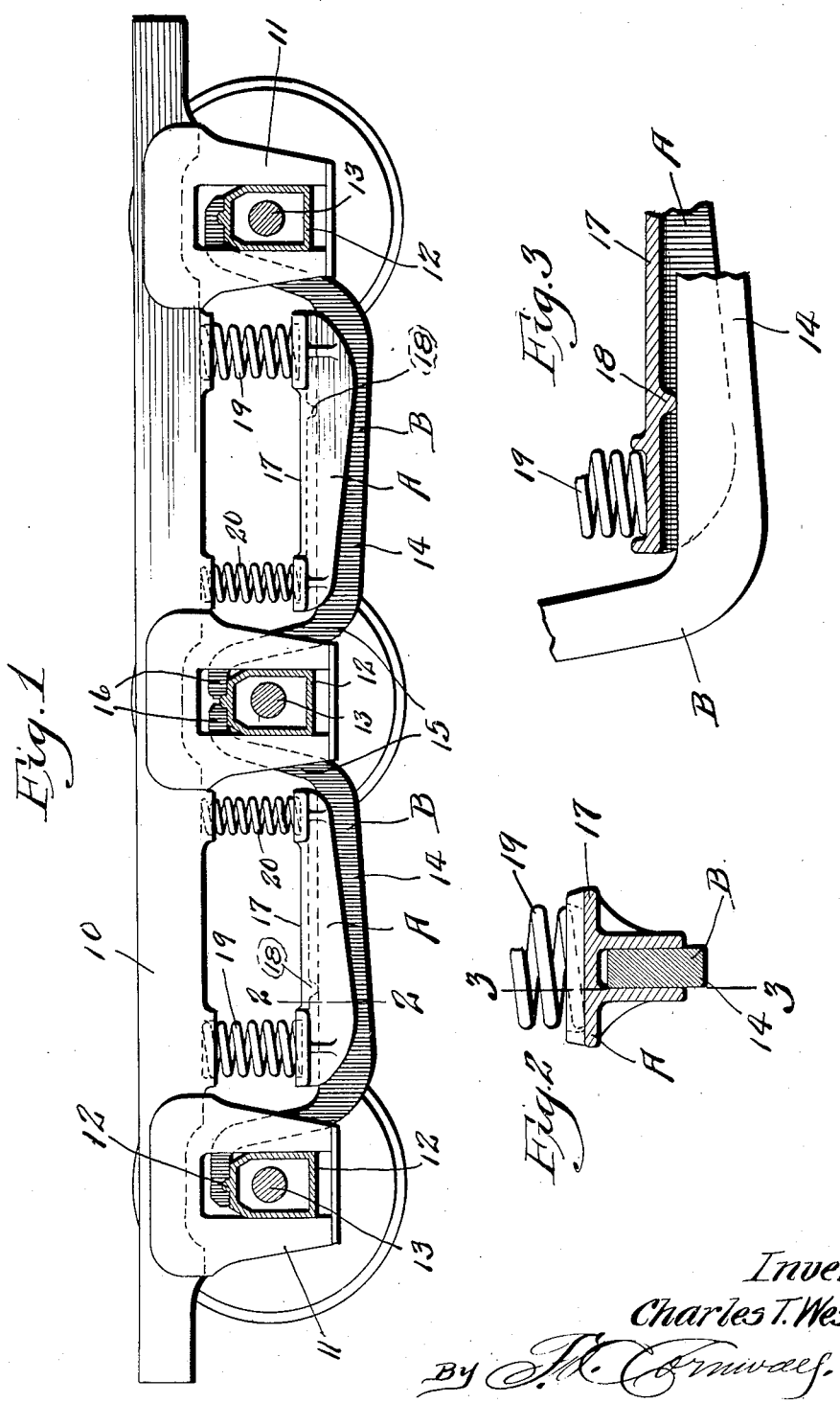

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

SIX-WHEEL CAR-TRUCK.

1,367,904.   Specification of Letters Patent.   Patented Feb. 8, 1921.

Application filed March 15, 1920. Serial No. 365,824.

*To all whom it may concern:*

Be it known that I, CHARLES T. WESTLAKE, a citizen of the United States, residing at St. Louis, Missouri, have invented a certain new and useful Improvement in Six-Wheel Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to the type of spring equalizer arrangement for six wheel car trucks disclosed in the copending patent application filed by Harry M. Pflager on February 5, 1920, Serial Number 356,545.

The subject-matter disclosed in the application just mentioned involves substantially rigid equalizer members bearing upon the journal boxes, and springs interposed between said equalizers and the truck frame, said springs having different load carrying capacities and being arranged so as to equally distribute between the journals of the truck, the weight of loads impressed on the truck frame.

It is the principal object of my invention to combine with the construction just mentioned and disclosed in the application aforesaid, auxiliary equalizers that are mounted for rocking movement upon the main equalizers; to interpose springs of different load carrying capacities between said auxiliary equalizers and the truck frame, and the fulcrums or rocking bearings for said auxiliary equalizers being disposed so that regardless of the degree to which the springs are extended or compressed, the loads transmitted through them to the auxiliary equalizers will always be divided in proper proportions betwen the truck journals.

Further objects of my invention are, to generally improve upon the construction of the load distributing arrangement heretofore utilized in six wheel car trucks, and to provide a relatively simple, reliable, and efficient arrangement which, in addition to effecting a proper and equal distribution of the imposed weights upon the truck journals, will be effective in the absorption of shocks and vibration due to track irregularities and preventing such shocks and vibrations from being transmitted to the car body.

With the foregoing and other objects in view, my invention consists in certain novel features of construction and arangement of parts, hereinafter more fully described and claimed, and illustrated in the accompanying drawings, in which—

Figure 1 is a side elevational view of a six wheel truck constructed in accordance with my invention.

Fig. 2 is an enlarged cross section taken approximately on the line 2—2 of Fig. 1.

Fig. 3 is a section taken approximately on the line 3—3 of Fig. 2.

Referring by numerals to the accompanying drawings, which illustrate a practical embodiment of my invention, 10 designates the wheel piece of an accepted type of six wheel truck frame, and rigidly fixed to said wheel piece are depending pedestal jaws 11 between which are positioned the usual journal boxes 12, the same containing the bearings for the journals of wheel carrying axles 13.

Disposed between the middle journal box on each side of the truck and the end journal boxes are main equalizing members 14, the end portions of which are bent upwardly as designated by 15, and thence outwardly into horizontal planes as designated by 16, and these last mentioned terminal portions bear on top of the journal boxes 12.

Positioned above the straight intermediate portion of each main equalizer 14 is an auxiliary equalizer 17, the same being preferably of inverted U-shape so that it straddles the body of the main equalizer, and formed within this auxiliary equalizer is a bearing lug 18, the rounded lower end of which bears directly on top of the body of the main equalizer 14. This rocking bearing or fulcrum 18 is positioned on the auxiliary equalizer 17 so that it is located at a point one-third of the distance from the outer axle to the middle axle, and this arrangement in connection with the action of the springs of different load carrying capacities which are positioned between the auxiliary equalizer and the truck frame is effective in dividing equally between the truck journals the weight of loads impressed on the truck frame regardless of the degree to which the springs are compressed or extended.

A spring 19 is interposed between the outer end of auxiliary equalizer 17 and the truck frame 10 and a spring 20 is interposed between the inner end of said auxiliary equalizer and the truck frame. Spring 19 is relatively heavy and therefore has greater load carrying capacity than spring 20, the proportions being such that spring 19 carries approximately two-thirds of the total amount of the weight transmitted to the two springs. As a result of this arrangement, the total weight of the loads carried by the truck frame will be equally distributed between the truck journals, and by arranging the auxiliary equalizer so that it has rocking movement upon the main equalizing member, this condition will prevail regardless of the degree to which either spring may be compressed or expanded.

The load distributing arrangement contemplated by my invention is comparatively simple, is capable of being easily and cheaply produced, materially increases the flexibility of the truck in addition to effecting an equal distribution of the loads between the truck axles, and is very effective in performing its intended functions.

It will be readily understood that minor changes in the size, form and construction of the various parts of my improved six wheel car truck can be made and substituted for those herein shown and described, without departing from the spirit of my invention, the scope of which is set forth in the appended claims.

I claim:

1. A flexible support for railway car trucks comprising main equalizing members supported upon the journal boxes associated with the truck, auxiliary equalizers supported to one side of their centers by said main equalizers, and springs interposed between said auxiliary equalizers and the truck frame.

2. A flexible support for railway car trucks comprising main equalizing members supported upon the journal boxes associated with the truck, auxiliary equalizers supported by said main equalizers, and springs interposed between said auxiliary equalizers and the truck frame, said springs having different load carrying capacities.

3. A flexible support for railway car trucks comprising main equalizing members supported upon the journal boxes associated with the truck, auxiliary equalizers supported by said main equalizers, and springs interposed between said auxiliary equalizers and the truck frame, one of which springs has greater load carrying capacity than the other.

4. A flexible support for railway car trucks comprising main equalizing members supported upon the journal boxes associated with the truck, auxiliary equalizing members supported at one side of their centers upon said main equalizers, and a pair of truck supporting springs associated with each auxiliary equalizing member.

5. A flexible support for railway car trucks comprising main equalizing members supported upon the journal boxes associated with the truck, an auxiliary equalizing member, and a pair of truck supporting springs of different load carrying capacities associated with each main equalizing member.

6. A flexible support for railway car trucks comprising main equalizing members supported upon the journal boxes associated with the truck, an auxiliary equalizing member fulcrumed upon each main equalizing member, and springs of different load carrying capacities interposed between said auxiliary equalizer and the truck frame.

7. A flexible support for railway car trucks comprising main equalizing members supported upon the journal boxes associated with the truck, an auxiliary equalizing member fulcrumed upon each main equalizing member, the fulcrum point being located at a point to one side of the center of said auxiliary equalizer, and springs of different load carrying capacities interposed between said auxiliary equalizer and the truck frame.

8. A flexible support for railway car trucks comprising main equalizing members supported upon the journal boxes associated with the truck, an auxiliary equalizer fulcrumed on each main equalizer, and truck frame supporting springs bearing upon said auxiliary equalizer.

9. A flexible support for railway car trucks comprising main equalizing members supported upon the journal boxes associated with the truck, an auxiliary equalizer fulcrumed on each main equalizer, and truck frame supporting springs bearing upon said auxiliary equalizer, one of which springs has greater load carrying capacity than the other.

10. A flexible support for railway car trucks comprising main equalizing members supported upon the journal boxes associated with the truck, an auxiliary equalizer fulcrumed on each main equalizer, the fulcrum point of said auxiliary equalizer being disposed to one side of the center thereof, a truck frame supporting spring supported by one end of said auxiliary equalizer, and a relatively lighter truck frame supporting spring carried by the other end of said auxiliary equalizer.

In testimony whereof I hereunto affix my signature this 9th day of March, 1920.

CHARLES T. WESTLAKE.